Dec. 22, 1936.   L. GOLDHAMMER   2,065,449
CAMERA
Filed Oct. 9, 1934

Inventor:
Leo Goldhammer,
By   Attorney
Philip S. Hopkins

Patented Dec. 22, 1936

2,065,449

UNITED STATES PATENT OFFICE 2,065,449

CAMERA

Leo Goldhammer, Munich, Germany, assignor to Agfa Ansco Corporation, Binghamton, N. Y., a corporation of New York Application October 9, 1934, Serial No. 747,632
In Germany October 12, 1933

6 Claims. (Cl. 88—1.5)

My present invention relates to a camera and more particularly to a folding camera.

Figure 1:
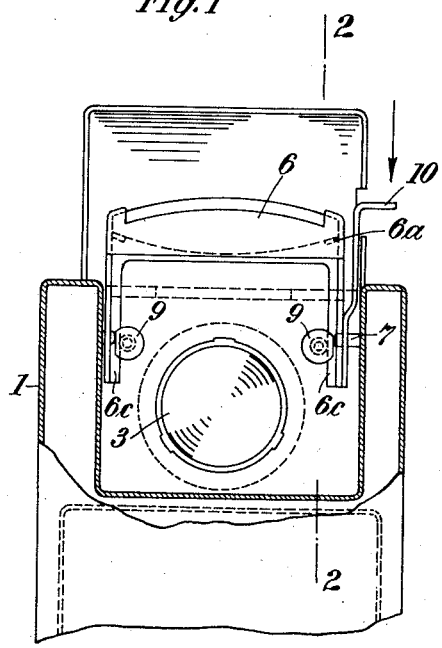
Figure 2:
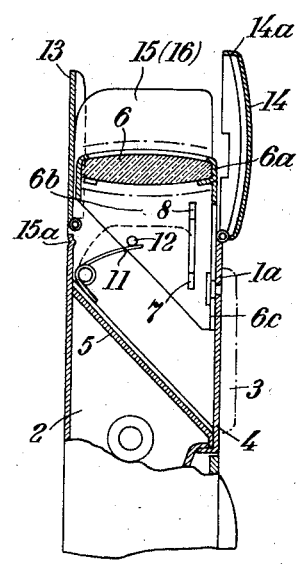
Figure 3:
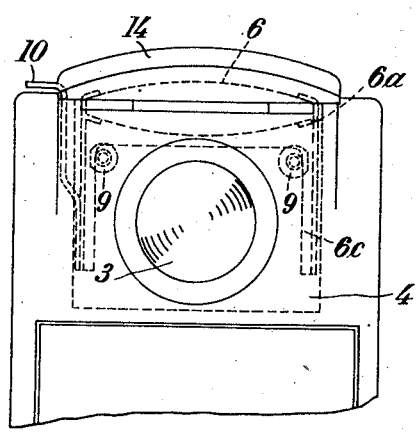
Figure 4:
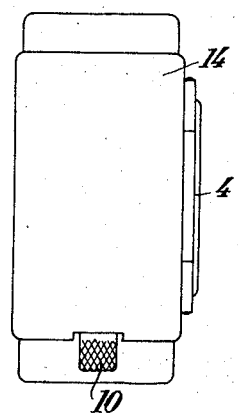

One of its objects is to provide a folding camera in which the brilliant finder is arranged in an improved manner. Further objects will be seen from the detailed specification following hereafter. Reference is made to the accompanying drawing in which Fig. 1 shows a rear view of the upper part of a camera with the finder mounted therein, the rear wall of the camera casing being partly broken away, so that parts lying behind the wall are visible, Fig. 2 shows a lateral view of the upper part of the camera along the line 2—2 of Fig. 1, Fig. 3 shows a front view of the upper part of the camera and Fig. 4 a top view of the camera.

In my copending application Ser. No. 696,424, filed Nov. 2, 1933, I have already proposed to arrange a reflex finder within the casing of a folding camera. In order to obtain an image as clear and as great as possible of the object to be photographed, a finder lens of a very great diameter has been used. Therefore, the finder lens must be mounted so that it can be slid inside the casing and does not stand out of the folded box. For this purpose, the lens has been mounted in such a manner that it lies parallel to the finder mirror when the camera is closed.

According to this invention I have found that it is preferable to arrange the finder lens on a slide. By this arrangement, the finder can easily be folded without increasing the dimensions of the camera or diminishing the quality of the finder picture. To this end the lens may be guided on rails or by means of a pin and slot connection.

The invention will now be described with reference to the accompanying drawing.

A reflex finder is arranged above the spool chamber 2 within the casing 1 of the folding camera. The finder objective 3 is fixedly mounted in the front wall 4 of the casing, whereas the finder mirror 5, which is inclined at 45° is mounted above the spool chamber 2. The finder lens 6 is arranged in a mount 6a and can be slid into the camera casing by means of a pin 7 fixed to the camera casing which engages the slot 8 of the lens mount. The finder lens mount 6a is furthermore guided by means of the screws or rivet heads 9 which are fixed to the front wall 4 of the camera. The mount 6a of the upper part of the finder is so constructed that on each side a triangular sheet metal piece 6b is formed which on the side extending along the front wall is bent to form a rail 6c which is guided, on the one hand, by the front wall 4 of the casing and, on the other hand, by the rivet heads 9. A bent piece 10 forming a handle is also mounted on the mount 6a. After exposure, the upper part of the finder is pushed into the camera by means of the handle 10 against the action of the spring 11 which is in contact with the pin 12 of the mount 6a and maintained in this position by closing the covers 13, 14, 15 and 16. The outermost cover 14 bears a nose 14a which engages a groove 15a of the casing and thereby retains the finder in the closed position. Upon opening the cover 14, the lens 6 automatically springs back in the position for use (cf. Figs. 1 and 2).

What I claim is:

1. In a folding camera in combination, a camera casing having a back wall and a front wall, a mirror inclined by 45° to said front wall and said back wall and fixedly connected to said walls, an objective lens mounted in said front wall in front of said mirror at a fixed distance from the latter for focussing an object to be photographed on said mirror, an eye lens having a diameter substantially equal to the width of said camera casing arranged at focussing distance from said mirror, and means for sliding said lens into said camera casing.

2. In a folding camera in combination, a camera casing having a back wall and a front wall, a mirror inclined by 45° to said front wall and said back wall and fixedly connected to said walls, an objective lens mounted in said front wall in front of said mirror for focussing an object to be photographed on said mirror, an eye lens having a diameter substantially equal to the width of said camera casing, a lens mount in which said eye lens is arranged and having two pieces of sheet metal extending perpendicularly to said front wall, two rivets fixed to said front wall at a substantial distance from each other, with their heads somewhat removed from said front wall, two rails fixed to said pieces for sliding so that said rails slidably engage between the heads of said rivets and said front wall, and means for moving said lens mount in and out of said camera casing.

3. In a folding camera in combination, a camera casing having a back wall and a front wall, a mirror inclined by 45° to said front wall and said back wall and fixedly connected to said walls, an objective lens mounted in said front wall in front of said mirror for focussing an object to be photographed on said mirror, an eye lens having a diameter substantially equal to the width of said camera casing, a lens mount in which said eye lens is arranged and having two pieces of sheet metal extending perpendicularly to said front wall, two rivets fixed to said front wall at a substantial distance from each other, with their heads somewhat removed from said front wall, two rails fixed to said pieces for sliding so that said rails slidably engage between the heads of said rivets and said front wall, slots in said pieces extending parallel with said rails, pins fixed to said camera casing and engaging said slots, and means for moving said lens mount in and out of said camera casing.

4. In a folding camera in combination, a camera casing having a back wall and a front wall, a mirror inclined by 45° to said front wall and said back wall and fixedly connected to said walls, an objective lens mounted in said front wall in front of said mirror for focussing an object to be photographed on said mirror, an eye lens having a diameter substantially equal to the width of said camera casing, a lens mount in which said eye lens is arranged and having two pieces of sheet metal extending perpendicularly to said front wall, two rivets fixed to said front wall at a substantial distance from each other, with their heads somewhat removed from said front wall, two rails fixed to said pieces for sliding so that said rails slidably engage between the heads of said rivets and said front wall, slots in said pieces extending parallel with said rails, pins fixed to said camera casing and engaging said slots, and a bent piece of metal fastened to said mount, the bent part forming a handle for moving said lens mount in and out of said camera casing.

5. In a folding camera in combination, a camera casing having a back wall and a front wall, a mirror inclined by 45° to said front wall and said back wall and fixedly connected to said walls, an objective lens mounted in said front wall in front of said mirror for focussing an object to be photographed on said mirror, an eye lens having a diameter substantially equal to the width of said camera casing, a lens mount in which said eye lens is arranged and having two pieces of sheet metal extending perpendicularly to said front wall, two rivets fixed to said front wall at a substantial distance from each other, with their heads somewhat removed from said front wall, two rails fixed to said pieces for sliding, so that said rails slidably engage between the heads of said rivets and said front wall, slots in said pieces extending parallel with said rails, pins fixed to said camera casing and engaging said slots, a pin mounted on one of said pieces, a spring mounted on said camera casing and engaging said pin on said pieces, thus pressing said lens away from said mirror, and a bent metal piece fastened to said mount, the bent part forming a handle for moving said lens mount into said camera casing.

6. In a folding camera in combination, a camera casing having a back wall and a front wall, a mirror inclined by 45° to said front wall and said back wall and fixedly connected to said walls, an objective lens mounted in said front wall in front of said mirror for focussing an object to be photographed on said mirror, an eye lens having a diameter substantially equal to the width of said camera casing, a lens mount in which said eye lens is arranged and having two pieces of sheet metal extending perpendicularly to said front wall, two rivets fixed to said front wall at a substantial distance from each other, with their heads somewhat removed from said front wall, two rails fixed to said pieces for sliding so that said rails slidably engage between the heads of said rivets and said front wall, slots in said pieces extending parallel with said rails, pins fixed to said camera casing and engaging said slots, a pin mounted on one of said pieces, a spring mounted on said camera casing and engaging said pin on said piece, thus pressing said lens away from said mirror, a lid rotatably connected to said front wall, a nose mounted on said lid, a groove provided in the wall opposite to the wall about which said lid is rotatable, said nose engaging said groove on closing said lid and holding said lens in said camera against the action of said spring, and a bent metal piece fastened to said mount, the bent part forming a handle for moving said lens mount into said camera casing.

LEO GOLDHAMMER.